Figure 1B:
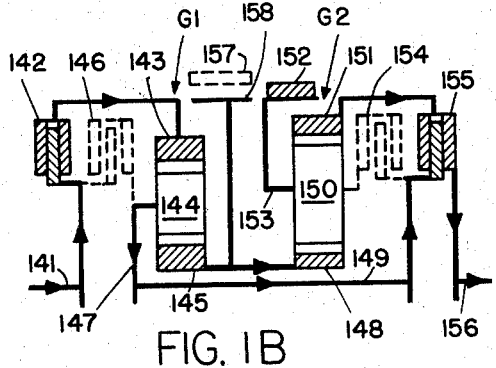

Feb. 17, 1959     H. W. SIMPSON     2,873,625
PLANETARY TRANSMISSION FOR SELF-PROPELLED VEHICLES
Filed April 4, 1957

INVENTOR.
Howard W. Simpson.
BY Farley, Forster & Farley.

United States Patent Office 2,873,625
Patented Feb. 17, 1959

2,873,625

PLANETARY TRANSMISSION FOR SELF-PROPELLED VEHICLES

Howard W. Simpson, Dearborn, Mich.

Application April 4, 1957, Serial No. 651,126

8 Claims. (Cl. 74—763)

This invention forms a continuation-in-part of my co-pending U. S. patent application Serial No. 482,102, filed January 17, 1955.

In Figs. 1 to 8 and Fig. 10 of Serial No. 482,102, torque delivered by a fluid coupling is transmitted directly to the ring gear of the first of two simple planetary gearsets and a clutch is provided between the sun gears of the two gearsets. This clutch is engaged in all speeds except sixth speed, which is an overdrive. When disengaged in overdrive, the speed differential of adjacent clutch plates is 100% of input speed which in some cases might cause objectionable heating of the clutch.

In the present disclosure the sun gears are connected at all times with no intervening releasable clutch. Instead, a clutch is provided between the input shaft and the ring gear of the first gearset. This clutch must also be released when in overdrive, but the plate differential is then only a fraction of input speed. This reduces heat generation due to clutch plate drag.

The main object of this disclosure is, therefore, to provide a 6 speed transmission which has low clutch drag. In the drawings, Figs. 1B to 7B are diagrammatic partial elevations in section of the transmission for all the speeds from first to sixth and reverse speed, respectively.

In the drawing, three plates are shown to indicate the multiple plate clutches and when they are engaged the plates are shown in solid lines and in section with one driving plate engaged between two driven plates. Released clutches are shown in dotted lines with the plates separated.

The gears shown in solid lines and in section are working, and those in dotted lines are idling or locked up to rotate in a fixed position of mesh. Hydraulic servomechanism for operating brakes and clutches is not shown as it is well known to those skilled in the art.

Brake bands are of the conventional external contracting type hydraulically applied and each band is shown as a horizontal rectangle in section when applied to its brake drum. When released, the band is shown in dotted lines and moved off its brake drum. The gearing consists of two simple planetaries G1 and G2.

In Figs. 1B to 7B clutches 142 and 146 are adapted to couple input shaft 141 to ring gear 143 and carrier 147, respectively, of gearset G1. Ring gear 143 meshes with planet gear 144 which in turn meshes with sun gear 145. Sun gears 145 and 148 and brake drum 158 are integral. Sun gear 148 meshes with planet gear 150 which in turn meshes with ring gear 151 which is integral with output shaft 156. Planet carrier 153 can be held by brake band 152 and can be coupled to carrier 147 by clutch 154 through shaft 149.

Clutch 155 couples carrier 147 to output shaft 156.

In low gear, Fig. 1B, ring gear 143 is driven by clutch 142 and carrier 153 is held by brake band 152 while clutch 155 transmits the torque of carrier 147 to output shaft 156. Sun gears 145 and 148 turn backward thus driving ring gear 151 forward with its torque added to that from carrier 147.

Figure 2B:
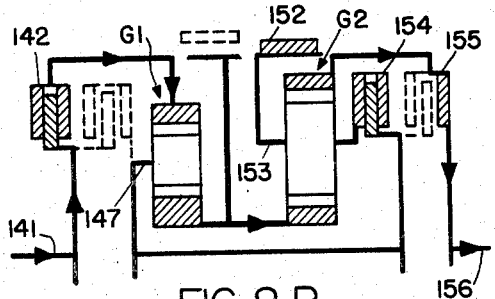

In second speed, Fig. 2B, clutch 142 and brake band 152 remain engaged but clutch 155 is released and clutch 154 engaged. As a result, carriers 147 and 153 are both held by brake band 152 as reaction members thus providing two reverse reductions in series which results in a net forward reduction at output shaft 156.

Figure 3B:
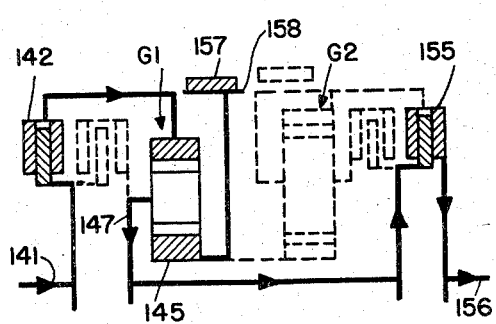

In third speed, Fig. 3B, clutches 142 and 155 and brake band 157 are engaged. Sun gear 145 is the reaction member and carrier 147 and output shaft 156 are driven at third speed. Gearset G2 idles slowly.

Figure 5B:
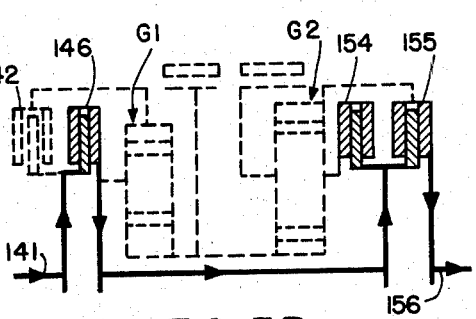
Figure 4B:
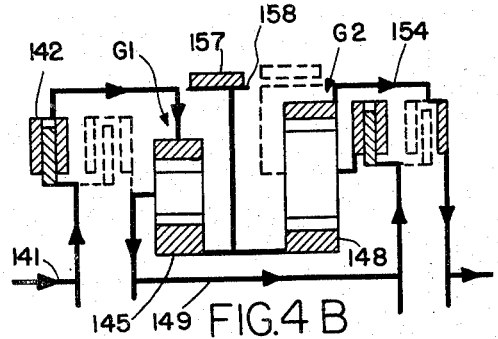

In 4th speed, Fig. 4B, clutch 142 and brake band 157 remain engaged and shaft 149 is driven at third speed and is then overdriven in gearset G2. Fifth speed is direct drive and there are several ways of obtaining it. In one method, clutches 146 and 155 transmit a direct drive from input shaft 141 to output shaft 156 without torque passing through the gear teeth, as shown in Fig. 5B. Clutch 154 remains engaged also but does not transmit torque.

In another method, clutches 142, 154 and 155 are engaged and this locks up both gearsets G1 and G2, thereby producing a one-to-one drive.

A third method of obtaining direct drive is by engaging all clutches, i. e., 142, 146, 154 and 155.

Figure 6B:
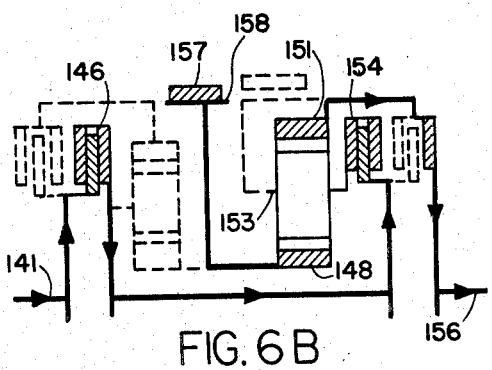

In 6th speed, Fig. 6B, clutches 146 and 154 are engaged and brake band 157 is applied. Input torque is transmitted by these two clutches to carrier 153 and with sun gear 148 as a reaction member, ring gear 151 is overdriven at 6th speed.

Figure 7B:
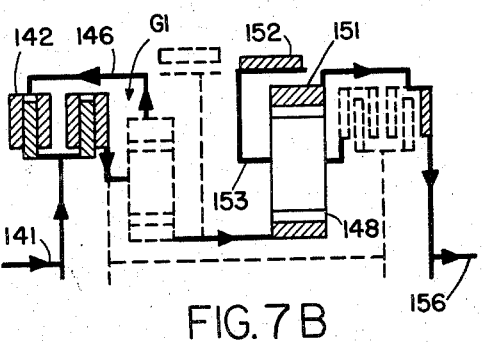

In reverse, Fig. 7B, clutches 142 and 146 are engaged and brake band 152 holds carrier 153 as a reaction member. Gearset G1 is locked up, sun gear 148 is the driving gear and ring gear 151 is driven backward.

While preferred embodiments have been described above in detail, it will be understood that numerous modifications might be resorted to without departing from the scope of my invention as defined in the following claims.

I claim:

1. In a variable speed transmission comprising a power input member, a load member, a first planetary gearset having a first element adapted to be driven by said power input member, a second planetary gearset having a first element adapted to drive said load member, selectively engageable clutch means between said first element of the first gearset and a second element of the first gearset, selectively engageable clutch means between said first element of the second gearset and a second element of the second gearset, selectively engageable clutch means between said second elements of each gearset, a driving connection between third elements of each gearset, a brake for holding said third elements and a brake for holding the second element of the second gearset.

2. In a variable speed transmission comprising power input and load members, a first planetary gearset having a first element adapted to be driven by the power input member, a second planetary gearset having a first element adapted to drive the load member, selectively engageable clutch means between the power input member and a second element of the first gearset, selectively engageable clutch means between said first element of the second gearset and a second member of the second gearset, a driving connection between third elements of each gearset, a brake for holding said third elements, and a brake for holding the said second element of the second gearset.

3. A variable speed transmission for a self-propelled vehicle comprising a power input member, a load member and a pair of axially aligned planetary gearsets therebetween, each set comprising sun, ring and planet carrier elements and at least one planet gear meshing with both the sun and ring elements, wherein selectively engageable connections are adapted to couple the input member either to the ring gear of the first gearset, the planet carrier of the first set, the planet carrier of the second set or the load member, and wherein a driving connection is provided between the sun gears, and a driving connection is provided between the ring gear of the second gear set and the load member.

4. A variable speed transmission comprising an input member, a load member, first and second axially aligned planetary gearsets each having sun, ring and carrier elements and at least one planet gear meshing with said sun and ring elements, wherein the first gearset has a power input connection for its ring element and both power input and output connections for its carrier element, a driving connection between its sun element and the sun element of the second gearset and a brake for holding said sun elements, and wherein the second gearset has a brake for holding its carrier element, a driving connection between its ring element and the load member and a driving connection between its carrier element and the carrier element of the first gearset.

5. A variable speed transmission for a self-propelled vehicle comprising power input and load members, a first planetary gearset, selectively engageable clutch means between the power input member and a first element of the first gearset and between the load member and a second element of the first gearset, a second planetary gearset having a first element adapted to drive the load member, selectively engageable clutch means between said second element of the first gearset and a second element of the second gearset, a driving connection between third elements of each gearset, and selectively engageable brake connections for holding said second and third elements stationary.

6. A variable speed transmission for a self-propelled vehicle comprising a power input member, a load member, a pair of axially aligned planetary gearsets interposed therebetween, each having sun, ring and carrier elements and at least one planet gear meshing with said sun and ring elements, a first clutch between the power input member and a first element of the first of said gearsets, a second clutch between the power input member and a second element of the first gearset, a driving connection between the first element of the second gearset and the load member, a third clutch between said second element of the first gearset and a second member of the second gearset, a driving connection between third elements of each gearset, a fourth clutch between said second element of the first gearset and the load shaft, brake means for holding said second elements of each gearset as reaction members when said second and fourth clutches are released and said first and third clutches are engaged to provide a gear reduction drive between said input and load members; and wherein a second gear reduction drive is established between the input and load members when the brake means is applied, said second and third clutches are released and said first and fourth clutches are engaged; and wherein a third gear reduction drive is established between said input and load members when the brake is applied, said third and fourth clutches are released and said first and second clutches are engaged.

7. A variable speed transmission for a self-propelled vehicle comprising a power input member, a load member, a pair of axially aligned planetary gearsets interposed therebetween, each having sun, ring and carrier elements and at least one planet gear meshing with said sun and ring elements, a first clutch between the power input member and a first element of the first of said gearsets, a second clutch between the power input member and a second element of the first gearset, a driving connection between the first element of the second gearset and the load member, a third clutch between said second element of the first gearset and a second member of the second gearset, a driving connection between third elements of each gearset, a fourth clutch between said second element of the first gearset and the load shaft, brake means for holding said third elements of each gearset when said second and third clutches are released and said first and fourth clutches are engaged to provide a gear reduction drive between said input and load members; and wherein a second gear reduction is established between the input and output members when the brake means is applied, said second and fourth clutches are released and said first and third clutches are engaged; and wherein an overdrive gear drive is established between said input and load members when the brake means is applied, said first and fourth clutches are released and said second and third clutches are engaged.

8. A variable speed transmission for a self-propelled vehicle comprising a power input member, a load member and a pair of axially aligned planetary gearsets interposed therebetween, each set comprising sun, ring and planet carrier elements and at least one planet gear meshing with both the sun and ring elements, wherein selectively engageable clutch connections are provided between the input member and the ring gear of the first gear set, the input member and the planet carrier of the first set, the planet carrier of the first gearset and the planet carrier of the second gearset and between the planet carrier of the first gearset and the load member, and wherein a driving connection is provided between the sun gears, and a driving connection is provided between the ring gear of the second gear set and the load member.

No references cited.